United States Patent
Lee et al.

(10) Patent No.: US 6,631,266 B1
(45) Date of Patent: Oct. 7, 2003

(54) METHOD FOR CALCULATING THE COVERAGE AREA ACCORDING TO THE ANTENNA PATTERNS IN A SECTOR BASE STATION

(75) Inventors: Sang-ho Lee, Seoul (KR); Byung-chul You, Seoul (KR)

(73) Assignee: Samsung Electronics Co. Ltd., Suwon (KR)

(*) Notice: Subject to any disclaimer, the term of this patent is extended or adjusted under 35 U.S.C. 154(b) by 0 days.

(21) Appl. No.: 09/391,704

(22) Filed: Sep. 8, 1999

(30) Foreign Application Priority Data

Sep. 8, 1998 (KR) .............................................. 98-36978

(51) Int. Cl.$^7$ ................................................. H04Q 7/36
(52) U.S. Cl. ....................... 455/446; 455/562; 455/448; 455/449
(58) Field of Search ................................. 455/446, 447, 455/448, 561, 562, 423, 424, 422

(56) References Cited

U.S. PATENT DOCUMENTS 5,983,106 A * 11/1999 Bernardin et al. ...... 455/446 X
6,356,758 B1 * 3/2002 Almeida et al. ........ 455/446 X

* cited by examiner

*Primary Examiner*—Nay Maung
*Assistant Examiner*—Philip J. Sobutka
(74) *Attorney, Agent, or Firm*—Cha & Reiter

(57) ABSTRACT

A method for determining a coverage area according to antenna patterns in a sector base station system provided that the antenna gain of the omni base station is identical to the antenna gain of the sector base station. The method includes the steps of calculating the ratio of the coverage area of the sector base station to the omni base station, calculating the coverage area of the omni base station considering a handover area, and multiplying the calculated ratio of coverage area of the sector base station by the calculated coverage area of the omni base station, to determine the number of base stations required in designing the wireless network by the operator.

6 Claims, 2 Drawing Sheets

METHOD FOR CALCULATING THE COVERAGE AREA ACCORDING TO THE ANTENNA PATTERNS IN A SECTOR BASE STATION

CLAIM OF PRIORITY

This application makes reference to, incorporates the same herein, and claims all benefits accruing under 35 U.S.C. § 119 arising from an application entitled, METHOD FOR CALCULTING THE COVERAGED AREA ACCORDING TO THE ANTENNA PATTERNS IN A SECTOR BASE STATION, earlier filed in the Korean Industrial Property Office on Sep. 8, 1998, and there duly assigned Serial No. 1998-36978.

FIELD OF THE INVENTION

The present invention relates to a method for providing the cell coverage area according to the antenna patterns in a sector base station. More particularly, the present invention relates to a method for determining the practical number of base stations required in an actual working environment.

DESCRIPTION OF THE RELATED ART

In general, it is necessary to consider both the traffic capacity and the coverage areas of a cell, simultaneously, in order to determine the effective number of base stations required for providing communication service in a given system. Thus, the effective number of base stations can be determined by considering two factors, the minimum number of the base station based on the coverage area and the minimum number of the base stations based on the traffic capacity. [The number of the base transceiver stations= MAX [min(area based), min(traffic based)].

The minimum number of the base stations based on the coverage area is calculated by dividing the total service area by the service area to which a base station can render service. The service area of a base station is calculated by analyzing a link budget using various parameters, and then calculating a cell radius according to the maximum allowable path loss through applying an appropriate propagation model. This path loss estimate is then used in the mobile cell-site link budget equation, solving for the mobile unit transmit power required to produce a desired signal level.

If the antenna gain of a sector base station and an omni base station is identical with each other, the effective coverage area of the sector system having a directional antenna is less than the area of the omni system with an omni-directional antenna.

FIG. 1 illustrates a method for determining coverage area of each base station in a sector system. Generally, in a single cell of the omni-system, the coverage area S of a base station is an area of a circle having a cell radius R ($S=\pi R^2$). Since, it is too difficult to determine the exact coverage area for each base station in multi-cell omni-system, the coverage area of a base station has been calculated on the basis of a hexagonal type cell model to account for the handover area.

In the omni system using the omni-directional antenna, it is suitable to calculate the coverage area of each base station, using the formula as stated in the previous paragraph. However, in a directional antenna used in the sector system, the coverage area for each base station depends on the antenna patterns. Thus, if the antenna gain of two systems were identical, the coverage area for each base station in the sector system is smaller than the omni system. In order to determine the coverage area for the sector system, the effective area should be calculated considering the hexagonal type cell model as well as antenna patterns. FIG. 2 illustrates change of the coverage area in a base station according to the antenna patterns in the sector system.

SUMMARY OF THE INVENTION

It is an object of the present invention to provide a method for determining an effective coverage area in the sector base station by providing a ratio of the coverage areas between the sector base station and the omni base station according to horizontal beam antenna patterns, which is then used to determine the number of the base stations required to provide communication service in a given system.

A preferred embodiment of a method for determining a coverage area according to antenna patterns in a sector base station system includes the steps of:

- calculating the ratio of the coverage area of the sector base station to the omni base station;
- calculating the coverage area of the omni base station considering a handover area;
- applying the calculated ration to determine the coverage area of the sector base station, by multiplying the calculated ratio of coverage area of the sector base station by the calculated coverage area of the omni base station;
- providing the number of the sector base stations required in a wireless system by dividing the total coverage area of the wireless system by the determined coverage area of the sector base station.

In the embodiment, it is preferable that said step for calculating the coverage area according to antenna pattern of the sector base station further comprises the steps of:

- determining a radius for each antenna angle to yield a maximum allowable path loss according to the horizontal beam antenna patterns;
- calculating a circle area for each antenna angle and dividing each calculated circle area by 360; and,
- determining the effective coverage area for the sector base station according to the horizontal beam antenna patterns by summing up each calculated area for each antenna angle.

And it is preferable that the coverage area of the omni base station considering a handover area is calculated by $$\frac{3 \times \sqrt{3}}{2} \times R^2,$$

where R represents a cell radius.

And it is preferable that the antenna position of a base station is apart from each other by an angle of 120°.

DESCRIPTION OF THE PREFERRED EMBODIMENTS

Figure 1:
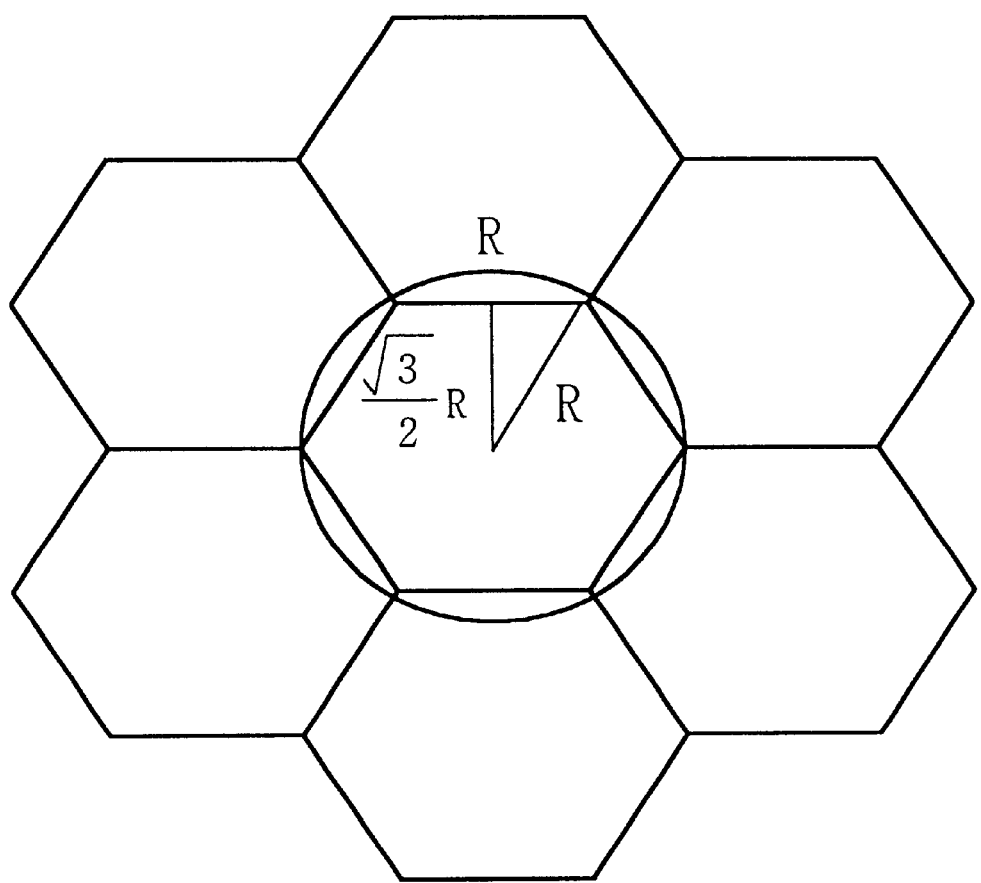
FIG. 1 illustrates a conventional method for calculating coverage area of each base station in a sector system.
Figure 2:
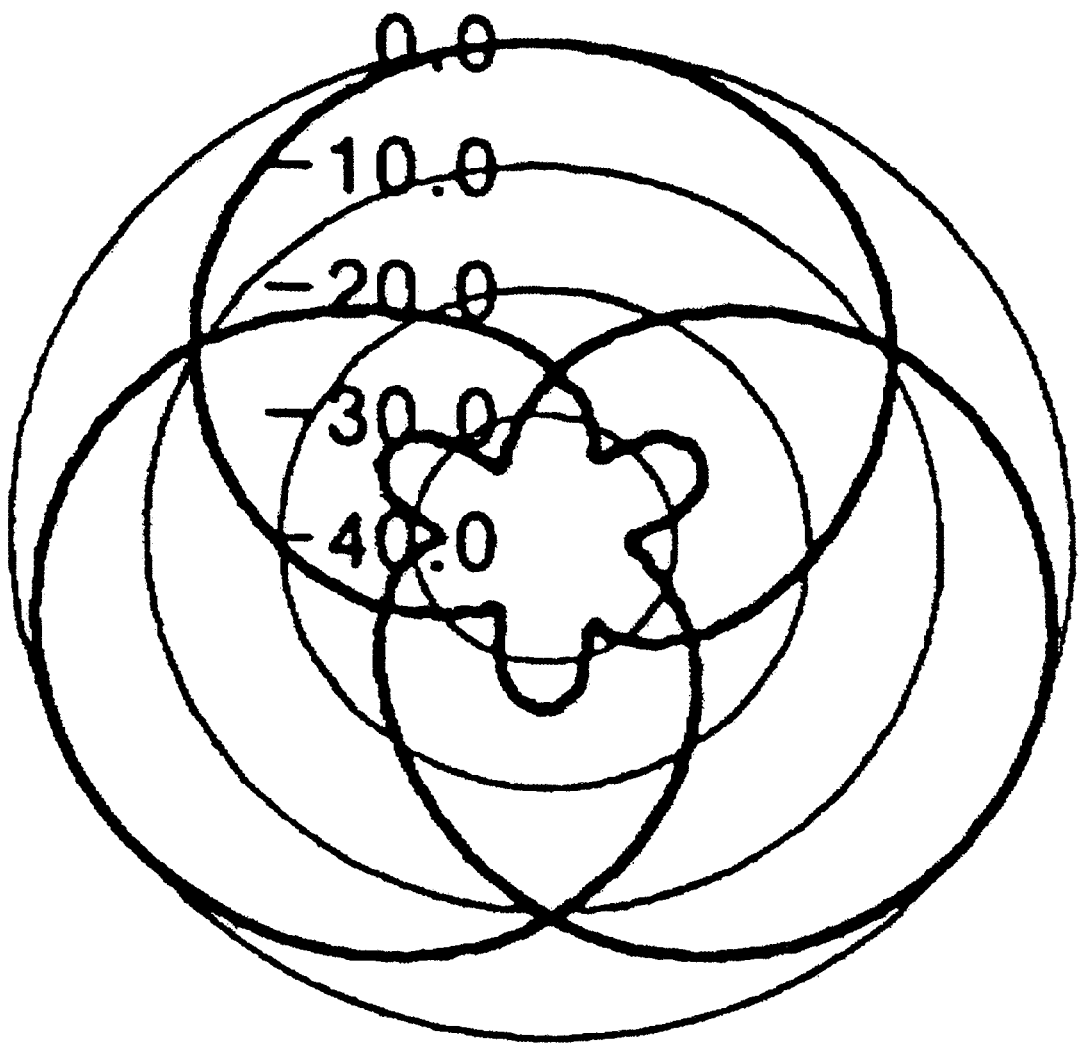
FIG. 2 illustrates change of the coverage area per a base station in the sector system according to the antenna patterns.

The present invention comprises two parts. One is a part for calculating the ratio (%) of the coverage area of a sector base station system to an omni base station, and the other is a part for applying the calculated ratio to determine the number of base stations required in designing the wireless network.

Firstly, it is desirable for the processor in the mobile unit to know the cell-site transmitter power and antenna gain (EIRP), the cell site G/T (receive antenna gain G divided by receiver noise level T), the mobile unit antenna gain, and the number of calls active at this cell-site. Thus, for calculating the coverage area of each base station, it is necessary to analyze link budget using various parameters, which allows the mobile unit to properly computer the reference power level for the local power setting function. This computation is achieved by calculating the cell-site to mobile link power budget, for solving for the path loss. This path loss is used in the mobile cell-site link budget equation, which is well known in the art, solving for the mobile unit transmit power required to produce a desired signal level. Accordingly, the cell radius according to the maximum allowable path loss can be determined, by applying an appropriate propagation model and a non-linear approach in estimating the path loss.

In the embodiment of the present invention, the link budget was analyzed for four types of scenarios as shown in below Table 1. The cell radius for each type was calculated in order to determine the effective coverage area according to various directional antenna patterns. The calculations are done on the assumption that the tri-sectored configuration, alpha($\alpha$)/ beta($\beta$)/ gamma($\gamma$) sectors in a base station, are located at 0, 120, 140 degree, respectively, whereby each directional antenna with 120 degree beamwidth is used.

The effective coverage are of a sector base station is determined by the following steps.

First, a ratio of the coverage area of a sector base station to an omni base station [$S_{sector}/S_{omni}$] is determined.

The coverage area of a base station is calculated by summing up the calculated areas according to horizontal beam antenna patterns, as defined in Formula 1.

$$S_{sector} = \Sigma A_i/360,$$ [Formula 1]

wherein the coverage area is calculated by the equation, $Ai=(\pi \times R_i^2/360)$. $R_i$ represents a radius for each antenna pattern angle, i degree, and determined by link budget to yield a maximum allowable path loss.

The coverage area of the omni base station ($S_{omni}$) is determined by $S_{omni}=\pi \times R_i^2$, wherein R represents a radius of the omni cell base station.

Then, the ratio (%) of the coverage area of the sector base station to the omni base station [$S_{sector}/S_{omni}$] is calculated on the assumption that the antenna gain of the two base stations is identical, and using the link budget equation.

Table 1 illustrates the ratio of the coverage area of a tri-sector base station to omni base station using above stated steps.

| | Urban | | Suburban | Country |
|---|---|---|---|---|
| Beam Width (°) | In-building | In-car | In-car | In-car |
| 40°(Algon) | 46.6% | 46.9% | 45.3% | 44.8% |
| 50°(DB-567) | 62.6% | 62.9% | 60.9% | 60.0% |
| 65°(Ace antenna) | 68.9% | 69.3% | 67.2% | 66.8% |
| 85°(Ace antenna) | 79.3% | 79.8% | 77.7% | 77.8% |
| 90°(Ace antenna) | 82.9% | 83.4% | 81.0% | 81.8% |
| 105°(Ace antenna) | 88.0% | 88.5% | 86.6% | 87.4% |
| 120°(Algon) | 88.5% | 88.9% | 86.9% | 87.8% |

After determining the ratio [$S_{sector}/S_{omni}$] based on different types of actual working environment, the next step is to calculate the coverage area for the omni system to account for the handover area, using a hexagonal cell model as shown in a FIG. 1.

$$S_{omni} = \frac{3 \times \sqrt{3}}{2} \times R^2$$ [Formula 2]

Finally, the coverage area of the sector base station including the handover area, is provided by multiplying the coverage area of the omni base station, as defined by Formula 2, by the ratio of the coverage area of the sector base station to the omni base station, as provided in Table 1.

$$S_{sector} = S_{omni} \times \alpha$$ [Formula 3]

wherein $\alpha$ represents the ratio of the coverage area of the sector base station to the omni base station.

After determining the effective coverage area of a sector base station, total number of sector base stations required in a given system can be provided by dividing the whole communication coverage area of the system by the coverage area of a sector determined according to Formula 3.

As illustrated in the above, the present invention provides an advanced method for providing the number of the base stations required in a system in designing a wireless network.

Accordingly, in the event that the antenna gain of the omni base station is identical to the antenna gain of the sector base station, the preferred embodiment of a method for determining a coverage area according to antenna patterns in a sector base station system includes the steps of:

calculating the ratio of the coverage area of the sector base station to the omni base station;

calculating the coverage area of the omni base station considering a handover area;

applying the calculated ration to determine the coverage area of the sector base station, by multiplying the calculated ratio of coverage area of the sector base station by the calculated coverage area of the omni base station;

providing the number of the sector base stations required in a wireless system by dividing the total coverage area of the wireless system by the determined coverage area of the sector base station.

In the embodiment, it is preferable that said step for calculating the coverage area according to antenna pattern of the sector base station further comprises the steps of:

determining a radius for each antenna angle to yield a maximum allowable path loss according to the horizontal beam antenna patterns;

calculating a circle area for each antenna angle and dividing each calculated circle area by 360; and, determining the effective coverage area for the sector base station according to the horizontal beam antenna patterns by summing up each calculated area for each antenna angle.

And it is preferable that the coverage area of the omni base station considering a handover area is calculated by $$\frac{3 \times \sqrt{3}}{2} \times R^2,$$

where R represents a cell radius.

And it is preferable that the antenna position of a base station is apart from each other by an angle of 120°.

What is claimed is:

1. A method for assigning an area of transmission to a plurality of sector base stations in order to provide a total number of said sector base stations required in an actual working environment, said method comprising the steps of:

(a) calculating a ratio of the coverage area of a sector base station to an omni base station, wherein the antenna gain of said omni base station and said sector base station is identical and wherein the coverage area of said sector base station is calculated by determining a radius of a horizontal beamwidth for each antenna angle to yield a maximum allowable path loss; calculating a circle area for each antenna angle using said determined radius and dividing said each calculated circle by 360, and summing up said each calculated circle area for said each antenna angle;

(b) calculating an area of transmission for said omni base station having handover area according to the following equation:

$$S_{omni} = \frac{3 \times \sqrt{3}}{2} \times R^2,$$

wherein R represents a cell radius;

(c) multiplying said calculated ratio in step (a) and said area in step (b) to determine said area of transmission for said sector base station having handover area; and, (d) assigning said area determined in step (c) to each of said plurality of sector base stations.

2. The method as set forth in claim 1, wherein said step (a) of calculating the coverage area of said omni base station ($S_{omni}$) is determined by the following equation:

$$S_{omni} = \pi \times R^2,$$

wherein R represents a radius of the omni cell base station.

3. The method as set forth in claim 1, wherein said horizontal beamwidth for said antenna is 120 degree.

4. A method for assigning an area of transmission to a plurality of sector base stations in order to provide a total number of said sector base stations required in an actual working environment, said method comprising the steps of:

(a) determining the coverage area of a sector base station;

(b) determining the coverage area of an omni base station;

(c) calculating a ratio of the coverage area of said sector base station to said omni base station, wherein the antenna gain of said omni base station and said sector base station is identical and wherein the coverage area of said sector base station is calculated by determining a radius for the horizontal beamwidth for each antenna angle to yield a maximum allowable path loss; calculating a circle area for each antenna angle using said determined radius and dividing said each calculated circle by 360, and summing up said each calculated circle area for said each antenna angle;

(d) calculating an area of transmission for said omni base station having handover area according to the following equation:

$$S_{omni} = \frac{3 \times \sqrt{3}}{2} \times R^2,$$

wherein R represents a cell radius;

(e) multiplying said calculated ratio in step (c) and said area in step (d) to determine said area of transmission for said sector base station having handover area; and, (f) assigning said area determined in step (e) to each of said plurality of sector base stations.

5. A method for assigning an area of transmission to a plurality of sector base stations in order to provide a total number of said sector base stations required in a given coverage area, said method comprising the steps of:

(a) determining a radius for the horizontal beamwidth for each antenna angle to yield a maximum allowable path loss;

(b) calculating a circle area for each antenna angle using said determined radius and dividing said each calculated circle by 360;

(c) summing up said each calculated circle area for said each antenna angle;

(d) determining the coverage area of an omni base station;

(e) calculating a ratio of the coverage area of said sector base station to said omni base station, wherein the antenna gain of said omni base station and said sector base station is identical;

(f) calculating an area of transmission for said omni base station having handover area is calculated according to the following equation:

$$S_{omni} = \frac{3 \times \sqrt{3}}{2} \times R^2,$$

wherein R represents a cell radius;

(g) multiplying said calculated ratio in step (e) and said area in step (f) to determine said area of transmission for said sector base station having handover area; and, (h) assigning said area determined in step (g) to each of said plurality of sector base stations, wherein the total number of said sector base stations is determined by the given coverage area with said area of transmission for said sector base station.

6. The method as set forth in claim 5, wherein said horizontal beamwidth for said antenna is 120 degree.

* * * * *